United States Patent [19]

Boots

[11] Patent Number: 4,609,222
[45] Date of Patent: Sep. 2, 1986

[54] OPEN ROOF-CONSTRUCTION FOR A VEHICLE

[75] Inventor: Robert T. Boots, Haarlem, Netherlands

[73] Assignee: Vermeulen-Hollandia Octrooien II B.V., Netherlands

[21] Appl. No.: 604,137

[22] Filed: Apr. 26, 1984

[30] Foreign Application Priority Data

May 6, 1983 [NL] Netherlands .......................... 8301610

[51] Int. Cl.⁴ .............................................. B60J 7/11
[52] U.S. Cl. ...................................... 296/218; 98/2.14
[58] Field of Search ................... 98/2.14; 296/218, 223, 296/224, 216, 217, 221, 222

[56] References Cited

U.S. PATENT DOCUMENTS

| | | | |
|---|---|---|---|
| 3,949,624 | 4/1976 | Bienert | 296/224 X |
| 4,085,965 | 4/1978 | Schlapp | 98/2.14 X |
| 4,126,352 | 11/1978 | Vogel | 296/218 |
| 4,364,601 | 12/1982 | Katayama et al. | 296/223 X |
| 4,420,184 | 12/1983 | Kaltz | 296/223 X |
| 4,452,013 | 6/1984 | Hagata | 296/223 X |

FOREIGN PATENT DOCUMENTS 2253712 5/1973 Fed. Rep. of Germany ....... 98/2.14
56-131421 10/1981 Japan .................................. 296/223

Primary Examiner—Harold Joyce
Attorney, Agent, or Firm—Kane, Dalsimer, Kane, Sullivan and Kurucz

[57] ABSTRACT

An open roof-construction for a vehicle having a roof opening, has a panel, which is movable from a closed position to a rearwardly and upwardly inclined ventilation position. The panel being displaceably supported near its front side, while the panel and the slide plate are connected with each other at a distance from the front side of the panel by a connection. The connection comprises a link having two legs, the upper part of one leg thereof pivotably engaging the panel by means of the pivot shaft and the upper end of the second leg thereof being pivotably connected to the one leg intermediate the ends of this one leg by means of a second transversely extending pivot shaft while both legs near their lower parts engage the slide plate and/or a stationary support, the leg portion disposed between the lower part of the one leg and the second pivot shaft enclosing an angle with the second leg, said angle being at its maximum in the closed position of the panel and at its minimum in the ventilation position of the panel.

23 Claims, 9 Drawing Figures

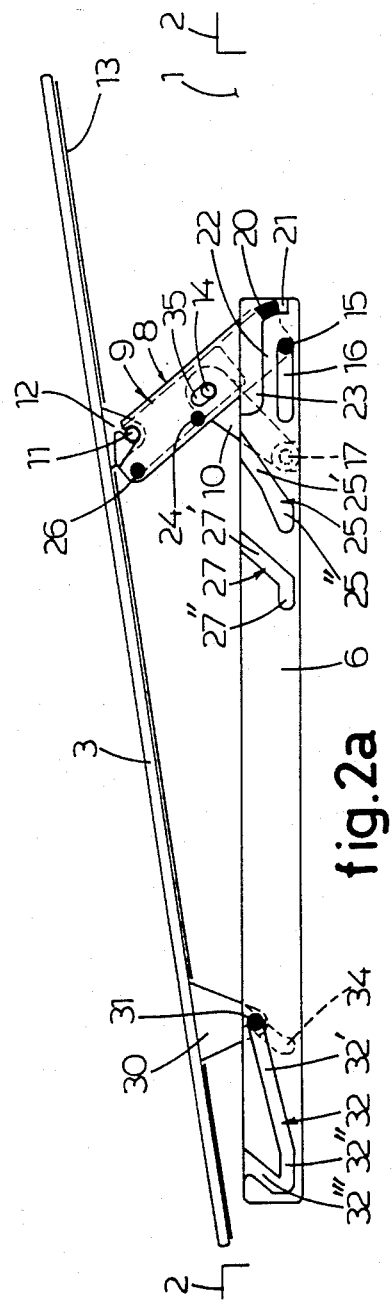
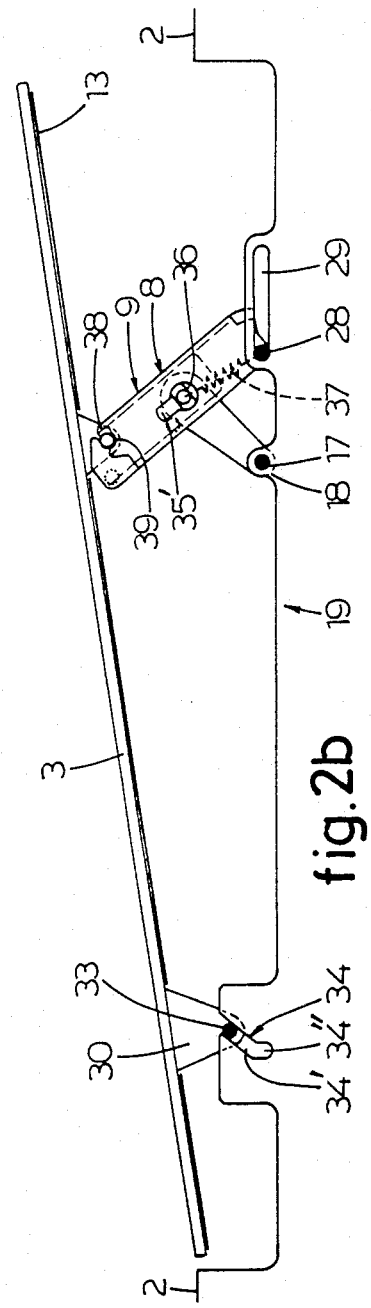
fig.2a
fig.2b

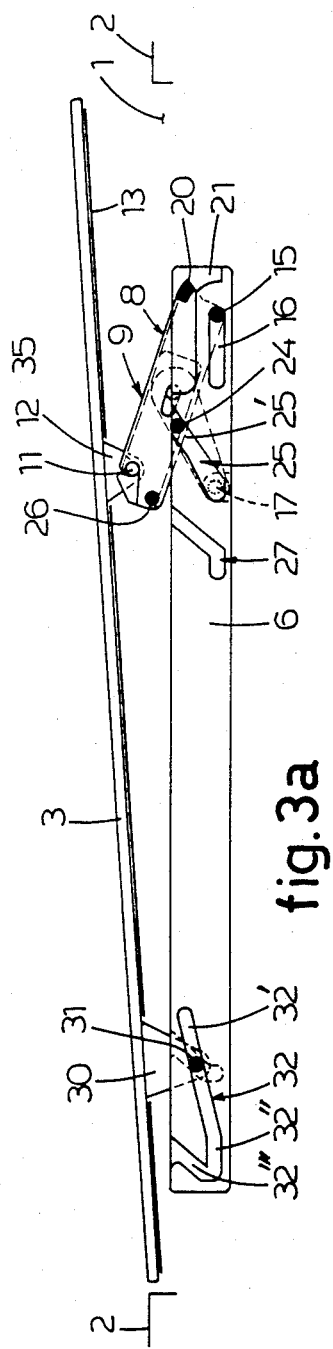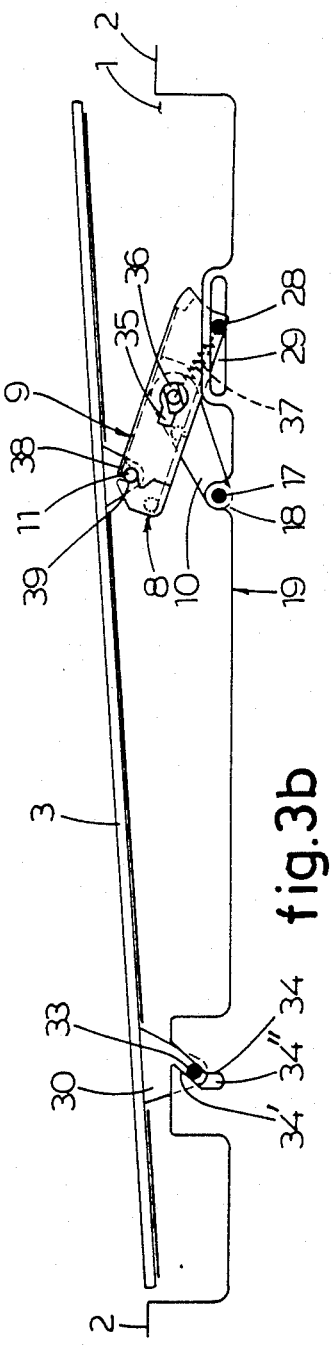

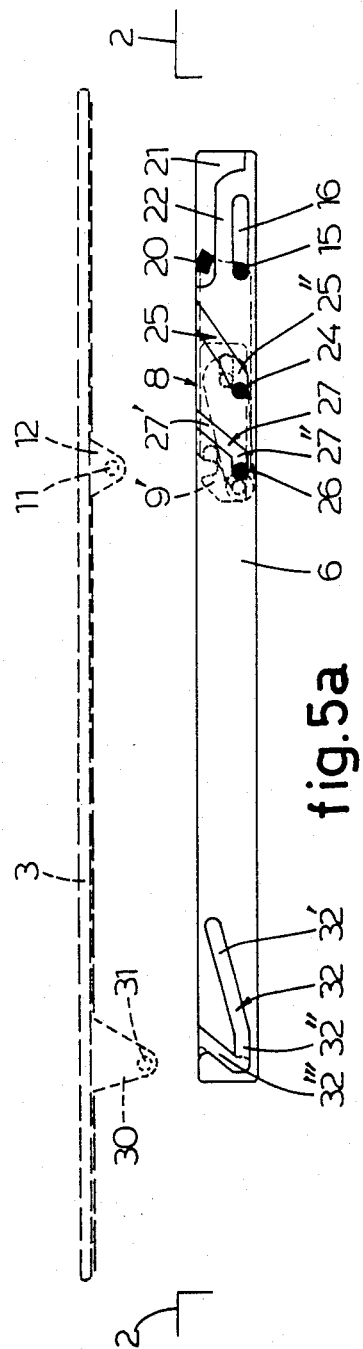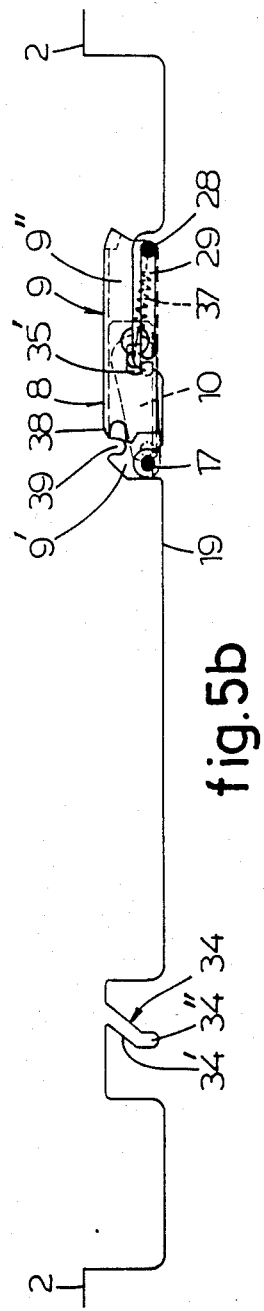

OPEN ROOF-CONSTRUCTION FOR A VEHICLE

The invention relates to an open roof-construction for a vehicle having a roof opening, comprising a panel, which is movable from a closed position to a rearwardly and upwardly inclined ventilation position and which may be returned from this ventilation position to the closed position, while for displacing the panel a pull-push means on at least one side engages a slide plate, which is guided in a stationary, substantially horizontal guide rail, the panel being displaceably supported near its front side, whilst the panel and the slide plate are connected with each other at a distance from the front side of the panel by a connection means having a guide pin, which engages a guide slot in the slide plate, said connection means being pivotably connected to the panel by means of a transversely extending pivot shaft.

Herein the term "ventilation position" denotes the position in which the rear edge of the panel is raised at a maximum.

The invention has the object of providing a very simple embodiment of such open roof-construction wherein the panel is displaceable in an infinitely variable manner between the closed position and the ventilation position and vice versa.

For this purpose, the open roof-construction according to the invention is characterized in that the connection means comprises a link means having two legs, the upper part of one leg thereof pivotably engaging the panel by means of the said pivot shaft and the upper end of the second leg thereof being pivotably connected to the one leg intermediate the ends of this one leg by means of a second transversely extending pivot shaft while both legs near their lower parts engage the slide plate and/or a stationary support, the leg portion disposed between the lower part of the one leg and the second pivot shaft enclosing an angle with the second leg, said angle being at its maximum in the closed position of the panel and at its minimum in the ventilation position of the panel.

The embodiment of the connection means as a link means results in that the panel can be displaced in an infinitely variable manner between the closed position and the ventilation position in an extremely simple manner.

Advantageously, the guide pin may be attached to the lower part of the one leg of the link means and the guide slot in the slide plate extends horizontally, while the lower end of the second leg of the link means is pivotably connected to the stationary support by means of a transverse shaft.

Further, the guide pin may engage the rear end of the guide slot in the ventilation position of the panel while the guide pin abuts against the front end of the guide slot in the closed position of the panel.

Furthermore, the lower part of the one leg may lie further rearwardly than the lower part of the second leg.

The one leg of the link means may comprise a protrusion which is positioned at the same side of the one leg as the guide pin, while in the ventilation position of the panel this protrusion lies at the lower and the rear side and extends in a recess formed in the slide plate behind the guide slot and engages the curved front wall of this recess, the protrusion leaving this recess when the panel is returned towards the closed position.

The invention will be explained hereinafter with reference to the drawings which very schematically represent an embodiment of an open roof-construction according to the invention by way of example.

FIGS. 2a and 2b are schematic side-views, seen in opposite directions, of the part of the open roof-construction according to FIG. 1 in the ventilation position of the panel.

FIGS. 3a and 3b are schematic side-views, similar to FIGS. 2a and 2b, of the open roof-construction in an intermediate position between the ventilation position and the closed position.

FIGS. 5a and 5b are schematic side-views, similar to FIGS. 2a and 2b, of the open roof-construction in the position wherein the panel can be removed.

Figure 1:
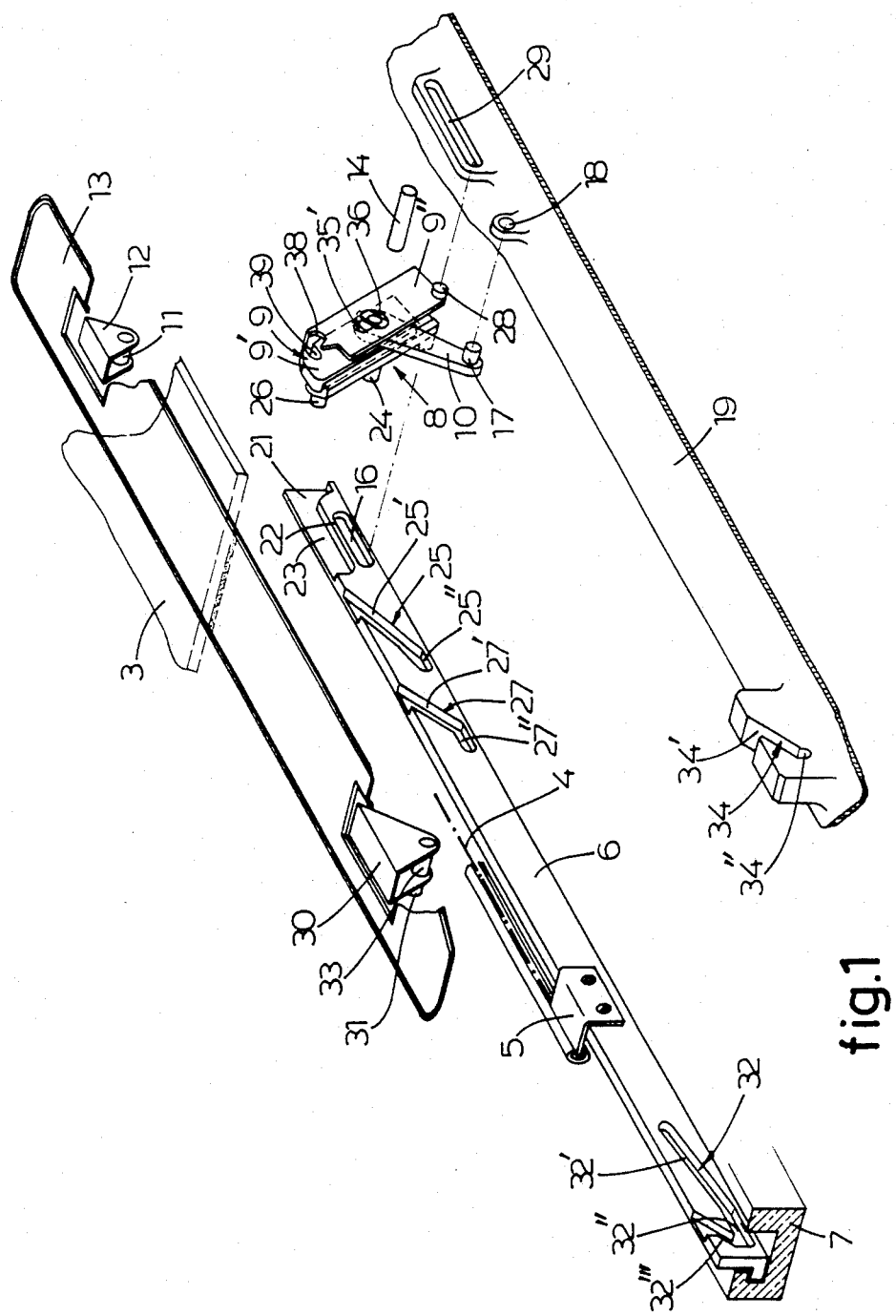
FIG. 1 is a schematic perspective view of a part of an embodiment of the open roof-construction according to the invention, wherein various members have been illustrated separated from each other.

The drawing represents by way of example an embodiment of an open roof-construction for a vehicle that is provided with an opening 1 in the fixed roof 2.

This open roof-construction comprises a panel 3 that can be moved in an infinitely variable manner from the closed position in the roof opening 1 to a rearwardly and upwardly inclined ventilation position and can be returned in an infinitely variable manner from this ventilation position to the closed position.

For displacing the panel 3 a cable-like pull-push means 4 has been provided on at least one side, but in general on both sides of the open roof-construction, which pull-push means can be displaced in the longitudinal direction of the vehicle by means of an actuating member (not illustrated) and engages a bracket 5 on a slide plate 6 that is guided in a substantially horizontal guide rail 7 mounted in the vehicle.

In general, such a stationary substantially horizontal guide rail 7 has been mounted on either side of the vehicle to guide a slide plate 6 disposed at the respective side of the vehicle, while each slide plate 6 can be moved by its own cable-like pull-push means 4 in its stationary guide rail 7. Both pull-push means 4 can be displaced commonly.

The embodiment shown in the drawing by way of example illustrates the slide plate 6 and the elements co-operating therewith on one side of the vehicle only, it being understood that in general on the other side of the vehicle similar parts are used, which constitute the mirror image of the parts illustrated in the drawing.

The panel 3 is displaceably supported near the front side in a manner to be hereinafter described.

At a distance behind the front side of the panel 3 the panel 3 and the slide plate 6 are connected to each other by a connection means embodying a link means 8 having two legs 9, 10.

The upper part of the one leg 9 of this link means 8 is pivotably connected by means of a transversely extending pivot shaft 11 to a bracket 12 at the lower side of a strip 13 mounted underneath the panel 3.

The upper end of the second leg 10 is pivotably connected with the leg 9 between the ends of the leg 9 by means of a second transversely extending pivot shaft 14.

A guide pin 15 is attached to the lower part of the leg 9 of the link means 8 and engages a horizontal guide slot 16 in the slide plate 6.

Figure 4A:
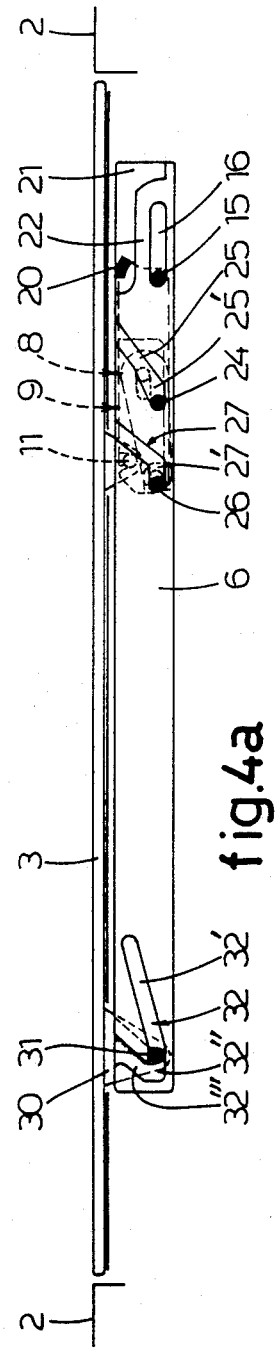
FIGS. 4a and 4b are schematic side-views, similar to FIGS. 2a and 2b, of the open roof-construction in the closed position.

As appears from a comparison of FIGS. 2a and 4a the guide pin 15 engages the rear end of the guide slot 16 in the ventilation position of the panel 3 while this guide pin 15 abuts against the front end of the guide slot 16 in the closed position of the panel 3.

The lower part of the leg 9 lies further rearwardly than the lower part of the leg 10.

The leg portion lying between the lower part of the leg 9 and the second pivot shaft 14 encloses an angle with the leg 10, which angle is at its maximum in the closed position of the panel 3 and at its minimum in the ventilation position of the panel 3.

The leg 10 of the link means 8 carries a pivot shaft 17 at its free lower end which pivot shaft 17 extends from the leg 10 in the direction opposite to the direction in which the guide pin 15 extends from the leg 9. This pivot shaft 17 is pivotably received in an eye 18 on a stationary support 19.

Furthermore, the leg 9 of the link means 8 is provided with a protrusion 20. In the ventilation position of the panel 3 this protrusion 20 lies at the lower and the rear side. The protrusion is disposed at the same side of the leg 9 as the guide pin 15. In the ventilation position of the panel 3 the protrusion 20 extends in a recess 21 in the slide plate 6 which recess lies behind the guide slot 16.

The protrusion 20 has a curved front wall which engages a correspondingly curved front wall of the recess 21.

When the panel 3 is moved from the ventilation position to the closed position by a rearward movement of the slide plate 6, the protrusion 20 leaves the recess 21 in an intermediate position (FIG. 3a) and this protrusion 20 comes to lie above the upper wall 22 of the guide slot 16 in the cavity 23 constituting the extension of the recess 21, so that the guide pin 15 can leave its rearmost position in the guide slot 16.

At a rearward movement of the slide plate 6 the guide pin 15 together with the protrusion 20 effects the first part of the downward pivotal movement of the leg 9 from its position in the ventilation position of the panel 3, until the guide pin 15 can leave its rearmost position in the guide slot 16.

The leg 9 of the link means 8 carries a first transverse pin 24 at its lower edge, in the central area, which first transverse pin is disposed at the same side of the leg 9 as the guide pin 15.

The slide plate 6 is provided with a first slot 25, which is inclined over its larger part and which lies in front of the guide slot 16. The slot 25 comprises a forwardly and downwardly inclined main part 25', which is open at the upper side and a horizontal lower end 25".

In the ventilation position of the panel 3 the transverse pin 24 is completely free of this slot 25 and only enters this slot 25 at the upper side when the panel 3 reaches the intermediate position illustrated in FIG. 3a, wherein the protrusion 20 has just left the recess 21 and has released the guide pin 15.

In the closed position of the panel 3 the transverse pin 24 extends in the horizontal lower end 25" of this slot 25.

At a rearward movement of the slide plate 6 from the intermediate position of FIG. 3a the slot 25 together with the transverse pin 24 effects a second or intermediate part of the downward pivotal movement of the leg 9 towards its position of FIG. 4a, following the first part of the downward pivotal movement of this leg 9 effected by the guide pin 15 and the protrusion 20, from the position of FIG. 2a to the position of FIG. 3a, as has already been explained hereinbefore.

After the transverse pin 24 has partially traversed the slot part 25', a second transverse pin 26 engages a second, mainly inclined slot 27 which lies in front of the slot 25 and which comprises a forwardly and downwardly inclined main part 27' which is open at its upper side and a horizontal lower end 27". The main part 27' is more steeply inclined than the slot part 25'.

This transverse pin 26 traverses the slot 27, while the transverse pin 24 moves through the lower part of the slot 25. The transverse pin 26 supports the downward pivotal movement of the leg 9 towards its closed position of FIG. 4a during a third and last part of this downward pivotal movement.

The transverse pin 26 and the slot 27 together with the transverse pin 24 and the slot 25 furthermore serve to effect the first part of the upward pivotal movement of the leg 9 of the link means 8 from its lowermost position wherein the panel 3 assumes its closed position. Because the transverse pin 26 lies at a short distance from the pivot shaft 11, this transverse pin 26 can effect this first part of the upward pivotal movement of the leg 9 of the link means 8 without applying a great force.

The transverse pin 24 in the slot 25 supports the operation of the transverse pin 26 in the slot 27 during the first part of the upward pivotal movement of the leg 9 and effects the second or intermediate part of the upward pivotal movement of the leg 9, after the transverse pin 26 has left the slot 27.

When the guide pin 15 on the leg 9 of the link means 8 has engaged the rear end of the guide slot 16, the transverse pin 24 leaves its slot 25 and the further upward pivotal movement of the leg 9 takes place by the engagement of the guide pin 15 with the rear end of this guide slot 16.

The lower part of the leg 9 of the link means 8 carries a further guide pin 28 which extends in the direction opposite to that of the guide pin 15 and which is aligned with this guide pin 15.

This further guide pin 28 is received in a horizontal longitudinal slot 29 in a raised part of the stationary support 19. The additional guidance provided by this further guide pin 28 enhances an easy adjustment of the panel 3.

The strip 13 underneath the panel 3 carries a front bracket 30 near the front side, which front bracket 30 is provided with a transversely extending guide peg 31 engaging a front slot 32 in the slide plate 6.

Furthermore, the bracket 30 carries a support shaft 33 which is aligned with the guide peg 31 and which can be displaced in a slot 34 which is open at the upper side and which is formed in a raised part of the stationary support 19.

The slot 34 comprises a steep forwardly and downwardly inclined part 34', the lower side of which joins a vertical downwardly extending slot part 34".

The slot 32 in the slide plate 6 comprises a forwardly and downwardly inclined part 32', which is less steeply inclined than the slot part 34' of the slot 34. The front end of the slot part 32' joins a horizontal slot part 32". The front end of the slot part 32" joins a steep rearwardly and upwardly inclined discharge part 32''', which is parallel to the slot part 34' of the slot 34.

In the closed position of the panel 3 the guide peg 31 is positioned in the horizontal part 32" of the slot 32, while the support shaft 33 has reached the vertically and downwardly extending slot part 34" of the slot 34.

Furthermore, the transverse pins 24 and 26 are positioned in the front ends of the horizontal slot parts 25" and 27" so as to establish a locking of the panel 3 in the vertical direction.

When the panel 3 is pivoted from the closed position to the ventilation position by a forward movement of the slide plate 6, the guide peg 31 traverses the rear part 32' of the front slot 32 in the slide plate 6 and prevents the front edge of the panel 3 from moving downwardly or forwardly during this pivotal movement.

In this manner damage to a sealing member mounted at the front side of the panel 3 and/or along the adjoining edge of the opening 1 in the fixed roof 2 is effectively prevented during a pivotal movement of the panel 3 from the closed position to the ventilation position.

Simultaneously with the movement of the guide peg 31 through the slot part 32' the support shaft 33 traverses the slot part 34'.

In the embodiment illustrated in the drawing, the leg 9 of the link means 8 is composed of an inner leg part 9' and a U-shaped outer leg part 9" slidably mounted thereon in order to obtain the possibility of an easy mounting and dismounting of the panel 3 in the closed position. The guide pin 15, the protrusion 20, the transverse pin 24, the transverse pin 26 and the further guide pin 28 are mounted on this outer leg part 9".

An elongated hole 35 is formed in the side-wall of the outer leg part 9" which lies at the side of the slide plate 6 while a keyhole-shaped opening 35' is provided in the other side-wall of this outer leg part 9".

The pivot shaft 14 fittingly extends through a hole in the inner leg part 9' and in the leg 10 and traverses the hole 35 and the opening 35'.

The leg 10 carries a cam 36 which is fittingly rotatable in the widest part of the keyhole-shaped opening 35' in the side-wall of the outer leg part 9". The cam 36 has a central bore in which the pivot shaft 14 fittingly extends. The cam 36 only permits a displacement of the pivot shaft 14 in the elongated hole 35 in the one side-wall of the outer leg part 9" and in the narrow part of the keyhole-shaped opening 35' in the other side-wall of the outer leg part 9" when the panel 3 assumes its closed position. In this position the legs 9 and 10 are substantially horizontal, while the cam 36 on the leg 10 is aligned with the long axis of the elongated hole 35 and with the narrow part of the keyhole-shaped opening 35'.

Figure 4B:
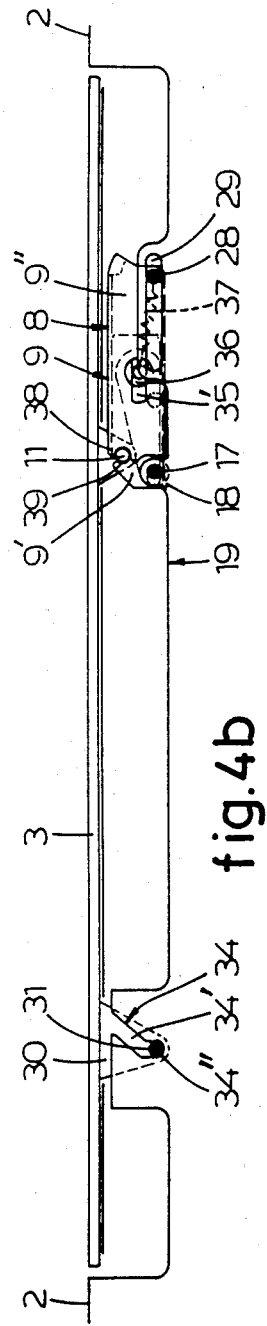

During a further rearward displacement of the slide plate 6 from the position of FIGS. 4a, 4b to the position of FIGS. 5a, 5b, which may take place after the release of a locking mechanism (not illustrated), the outer leg part 9" will be rearwardly shifted with respect to the inner leg part 9' against the force of a spring 37 which engages the pivot shaft 14 on the one side and the lower rear part of the outer leg part 9" on the other side.

During this further rearward displacement of the slide plate 6 the leg 10 will not be able to follow this movement, since the pivot shaft 17 is retained by the eye 18 on the stationary support 19, while the inner leg part 9' which is coupled to the leg 10 by means of the pivot shaft 14, can neither take part in the further rearward displacement of the slide plate.

On the other hand the outer leg part 9" has to follow this further rearward displacement of the slide plate 6 in consequence of the engagement of the guide pin 15 with the front end of the guide slot 16 in the slide plate 6.

Due to this rearward movement of the outer leg part 9" relative to the inner leg part 9' a lip 38 on the outer leg part 9" exposes a cavity 39 in the inner leg part 9', wherein the pivot shaft 11 is mounted, so that this pivot shaft 11 can leave the cavity 39 in the inner leg part 9' in the upward direction.

During the further rearward displacement of the slide plate 6 the slot parts 32'" and 34' have become aligned with each other and the guide peg 31 lies at the lower side of the slot part 32'", so that the guide peg 31 and the support shaft 33 can be raised so as to follow the path of these slot parts 32'" and 34'.

After the guide peg 31 and the support shaft 33 have left the slot parts 32'" and 34' at the upper side and the pivot shaft 11 has been raised out of the cavity 39, the panel 3 is completely freed.

For mounting the panel 3 again this panel 3 is lowered until the pivot shaft 11 is received in the cavity 39 in the inner leg part 9' and the guide peg 31 as well as the support shaft 33 have traversed the slot parts 32'" and 34' and have reached the position in the slots 32, 34 according to FIGS. 4a, 4b again.

Subsequently, the slide plate 6 is moved somewhat forwardly, the spring 37 causing the outer leg part 9" to follow this movement, so that the cavity 39 in the inner leg part 9' is closed again at the upper side by the lip 38.

Thereupon, the locking mechanism is engaged again, so as to prevent the slide plate 6 from moving accidentally to the rearmost release position.

In the embodiment illustrated in the drawings the slide plate 6 is displaceable in the stationary guide rail 7, while the stationary support 19 with the eye 18 and the longitudinal slot 29 constitutes a separate member. Under circumstances, however, it is possible to combine the guide rail 7 and the stationary support 19 to a single member.

The invention provides an open roof-construction wherein the panel 3 may be displaced between the closed position and the ventilation position in an infinitely variable manner.

Furthermore, the guidance of the panel 3 by means of the co-operating slide plates 6, the link means 8 and the stationary supports 19 is very stable, so that the panel 3 is always effectively prevented from rattling.

The invention is not limited to the embodiment illustrated in the drawings, which can be varied in various manners within the scope of the appended claims.

I claim:

1. An open roof construction for a vehicle having a roof opening comprising:

a panel for closing said roof opening and having a front side, said panel having a closed-position, and being movable from said closed position only to a rearwardly and upwardly inclined ventilation position, said panel being returnable from said ventilation position to said closed position;

a stationary, substantially horizontal rail and a stationary support;

a slide plate movably engaged by said horizontal rail, and having a first horizontal guide slot and a second slot lying in front of said first slot, said second slot being open at the upper side and being at least partially inclined forwardly and downwardly;

a first transversally extending pivot shaft disposed at a preselected distance from said panel front end for displaceable supporting said panel;

a slide plate connection means for interconnecting said slide plate and said panel, said slide plate connection means having a link means with two legs; one leg of said two legs having an upper part pivotably engaging said first shaft, a lower part carrying a guide pin which engages said first guide slot in said plate, said first guide slot having a rear end engaged by said guide pin when said panel is in the ventilation position and a front end which is abutted by said guide pin when said panel is in said closed position; a second transverse pivot shaft for pivotably connecting a second leg of said two legs to the one leg at a position intermediate between said upper and lower parts;

said one leg being further provided with a first transverse pin, which lies at the same side of the one leg as the guide pin and which co-operates with the slot in the slide plate which is open at the upper side, the first transverse pin being completely clear of this slot in the ventilation position of the panel and enters this slot at the upper side in an intermediate position between the ventilation position and the closed position;

said second leg having a lower part carrying a third transverse shaft extending in a direction facing away from said slide plate, said third transverse shaft being pivotably connected to said stationary support, wherein the lower part of said one leg is disposed rearwardly from the lower part of said second leg, a portion of said one leg between said one leg lower part and said second shaft forming an angle with said second leg which is at a maximum in the rearwardly and downwardly position of the panel and at a minimum in the ventilation position of the panel; and a pull-push means engaging said slide plate for moving said panel.

2. Open roof-construction according to claim 1, wherein the slide plate has a recess formed with a curved front wall behind the first guide slot wherein the one leg of the link means comprises a protrusion which is positioned at the same side of the one leg as the guide pin, while in the ventilation position of the panel this protrusion lies at the lower and the rear side and extends in said recess and engages the curved front wall of this recess, the protrusion leaving this recess when the panel is returned towards the closed position.

3. An open roof construction as claimed in claim 1, wherein the first transverse pin on the one leg is disposed at the lower side in the central area of the one leg.

4. Open roof-construction according to claim 1, wherein the one leg of the link means is provided with a second transverse pin disposed in front of the first transverse pin, near the first pivot shaft between the one leg and the panel, at the same side of the one leg as the guide pin, while the slide plate has a third slot which is open at the upper side and which co-operates with this third transverse pin, said third slot lying in front of the second slot, which co-operates with the first transverse pin, whilst the third slot is at least partially inclined forwardly and downwardly and is more steeply inclined than the second slot, while the third transverse pin only enters the third slot after the second transverse pin has already partly traversed the second slot.

5. Open roof-construction according to claim 4 wherein the third slot in the slide plate which co-operates with the third transverse pin has a substantially horizontal lower end.

6. Open roof-construction according to claim 1, wherein the lower part of the one leg of the link means carries a further guide pin which extends in a direction opposite to that of the said guide pin and which is received in a horizontal longitudinal slot in the stationary support.

7. Open roof-construction according to claim 6 wherein the guide pin and the further guide pin are aligned with each other.

8. Open roof-construction according to claim 1, wherein the panel carries a transversely extending guide peg near its front side which guide peg engages a front slot in the slide plate, said front slot being at least partially inclined forwardly and downwardly.

9. Open roof-construction according to claim 8, wherein the front slot comprises a rear part which is inclined forwardly and downwardly and a substantially horizontal part which joins the front side of said rear part.

10. Open roof-construction according to claim 9, wherein the panel carries a transversely extending support shaft near its front side which support shaft extends in a direction oppoiste to that of the said guide peg and engages a fourth slot in the stationary support, which fourth slot is open at the upper side and is at least partially inclined forwardly and downwardly.

11. Open roof-construction according to claim 10, wherein the slot in the stationary support comprises a rear part which is inclined forwardly and downwardly and a substantially vertical downwardly extending part which joins the lower side of said rear part.

12. Open roof-construction according to claim 10, wherein the guide peg and the support shaft are aligned with each other.

13. Open roof-construction according to claim 11, wherein the front end of the substantially horizontal part of the front slot in the slide plate joins an upwardly and rearwardly inclined slot part, which is parallel to the forwardly and downwardly inclined rear part of the slot in the stationary support and which is open at the upper side.

14. Open roof-construction according to claim 1 wherein an adjacent one leg to the link means comprises two relatively movable leg parts, the pivot shaft which connects the adjacent one leg with the panel being received in a cavity in one of the leg parts, which cavity is closed in a first or closing position of the other leg part and is exposed in a second or release position of the other leg part.

15. Open roof-construction according to claim 14, wherein both leg parts are movable relative to each other by means of the slide plate.

16. Open roof-construction according to claim 14, wherein the other leg part is loaded by a spring towards the closing position.

17. Open roof-construction according to claim 14, wherein the other leg part comprises a lip adapted to close the cavity in the one leg part in the closing position.

18. Open roof-construction according to claim 14, wherein the one leg part in which the cavity is formed is an inner leg part partially surrounded by the other leg part which is substantially U-shaped.

19. Open roof-construction according to claim 14, wherein in the closing position of the other leg part both leg parts are locked relatively to each other by a locking mechanism, which is released in the closed position of the panel, while a further movement of the slide plate in the closed position of the panel causes a movement of the other leg part to the release position, the spring returning the other leg part to the closing position when the slide plate is returned.

20. Open roof-construction according to claim 19, wherein an elongated hole is formed in one side-wall of the other leg part, while a keyhole-shaped opening is provided in the second side-wall of said other leg part, the pivot shaft connecting both legs of the link means fittingly extending through a hole in the one leg part and a hole in the other leg whilst said pivot shaft further passes the elongated hole and the keyhole-shaped opening in the side-walls of the other leg part, while the other leg carries a cam which is fittingly rotatable in the wide part of the keyhole-shaped opening in the other side-wall of the outer leg part and is provided with a central bore in which the pivot shaft fittingly extends, said cam only permitting the pivot shaft to be moved in the elongated hole and in the narrow part of the keyhole-shaped opening when the panel is in the closed position.

21. Open roof-construction according to claim 1, wherein both legs of the link means extend substantially horizontally in the closed position of the panel.

22. Open roof-construction according to claim 1, comprising two slide plates, one at each side, each slide plate being movable by its own pull-push means.

23. Open roof-construction according to claim 3, wherein the second slot in the slide plate which cooperates with the transverse pin has a substantially horizontal lower end.

* * * * *